(12) United States Patent
Bussear

(10) Patent No.: US 6,364,014 B1
(45) Date of Patent: Apr. 2, 2002

(54) FLOW MONITORING AND CONTROL IN MULTI-LATERAL WELLBORES

(75) Inventor: Terry R. Bussear, Friendswood, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/570,467

(22) Filed: May 12, 2000

Related U.S. Application Data

(60) Provisional application No. 60/133,904, filed on May 13, 1999.

(51) Int. Cl.[7] .............................................. E21B 17/18
(52) U.S. Cl. ..................... 166/242.3; 166/313; 166/319
(58) Field of Search ........................... 166/242.3, 242.5, 166/117.5, 313, 319, 250.01; 137/109, 115.01, 115.11, 115.13

(56) References Cited

U.S. PATENT DOCUMENTS 3,626,969 A * 12/1971 Garrett ....................... 137/155
5,050,681 A * 9/1991 Skinner ....................... 166/374

FOREIGN PATENT DOCUMENTS

| EP | 0 859 123 | 8/1998 |
| EP | WO 9848145 | 10/1998 |
| GB | 2196410 | 4/1988 |
| GB | 2261519 | 5/1993 |
| GB | 2 295 840 | 6/1996 |
| WO | WO 99/02818 | 1/1999 |

* cited by examiner

Primary Examiner—David Bagnell
Assistant Examiner—Zakiya Walker
(74) Attorney, Agent, or Firm—Cantor Colburn LLP

(57) ABSTRACT

An apparatus for monitoring and controlling flow in offset parallel bores contained within a single completion component provides parallel bores and recesses for mounting monitoring or control devices in a single unit which is sized to fit within an 8.5" I.D. of a 9⅝" standard casing of an oil field wellbore.

11 Claims, 6 Drawing Sheets

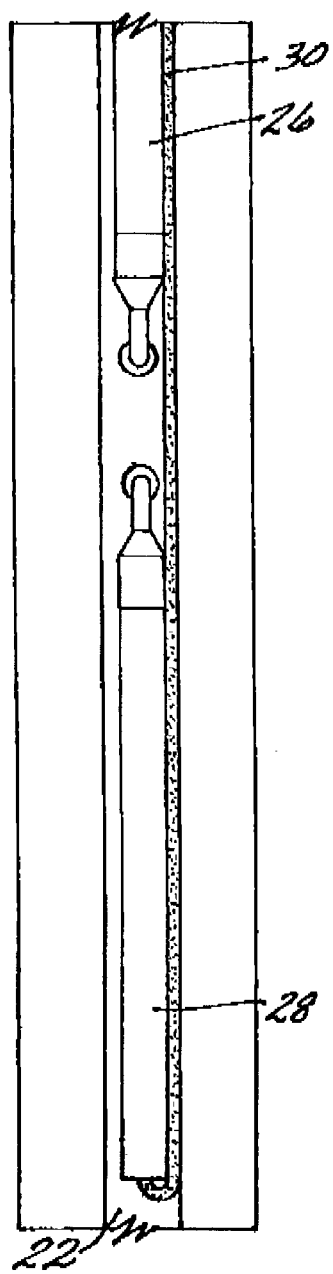
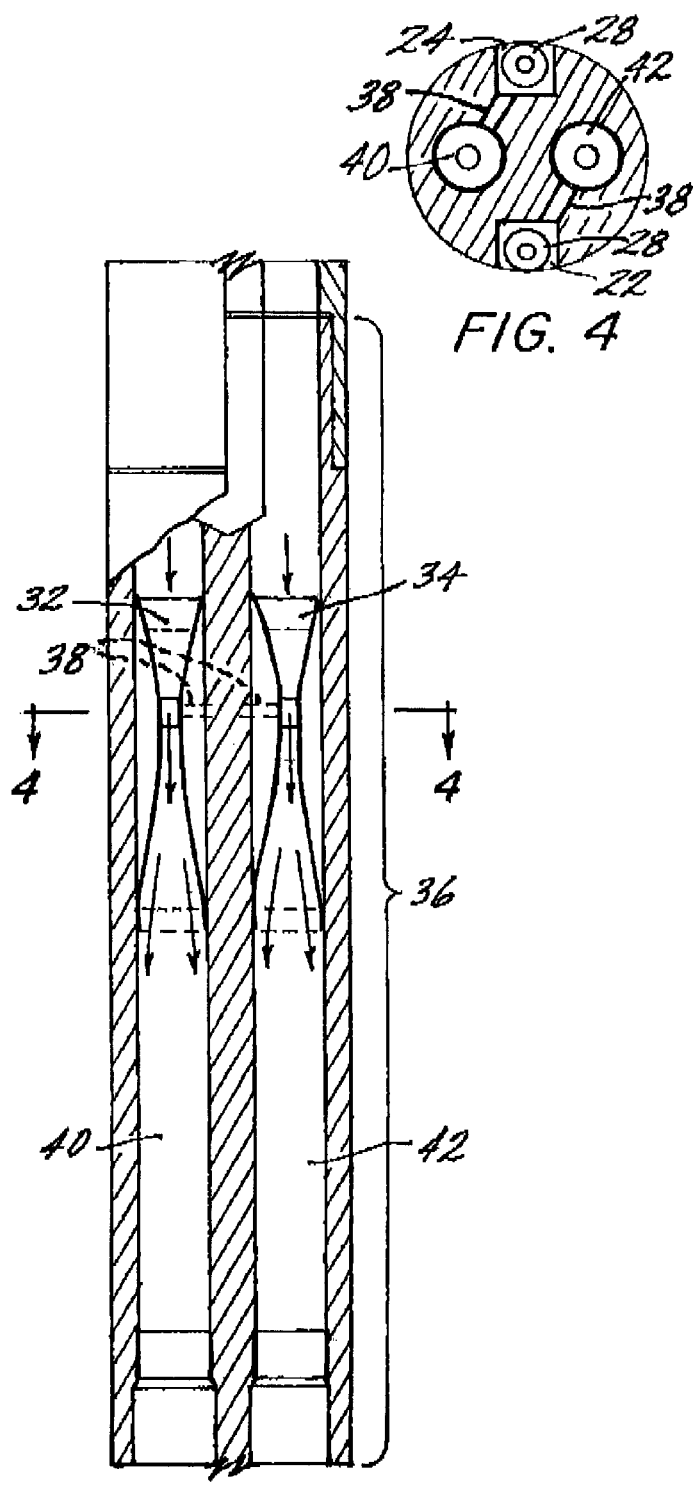
FIG. 2   FIG. 3   FIG. 4

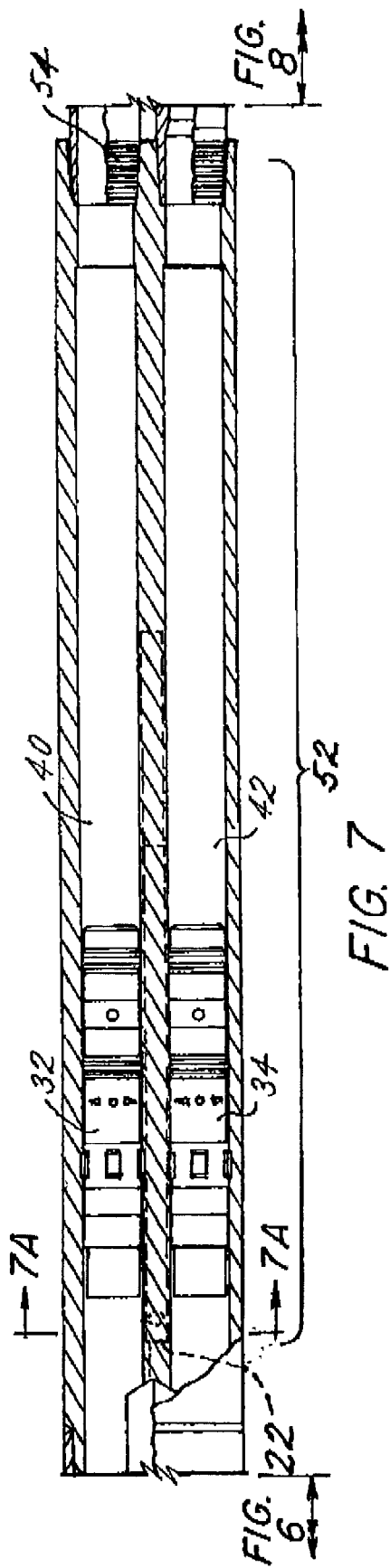
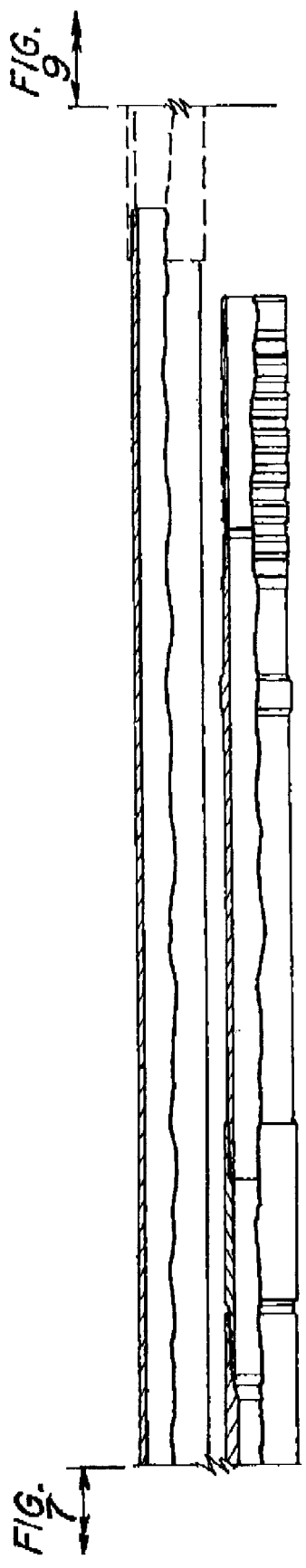

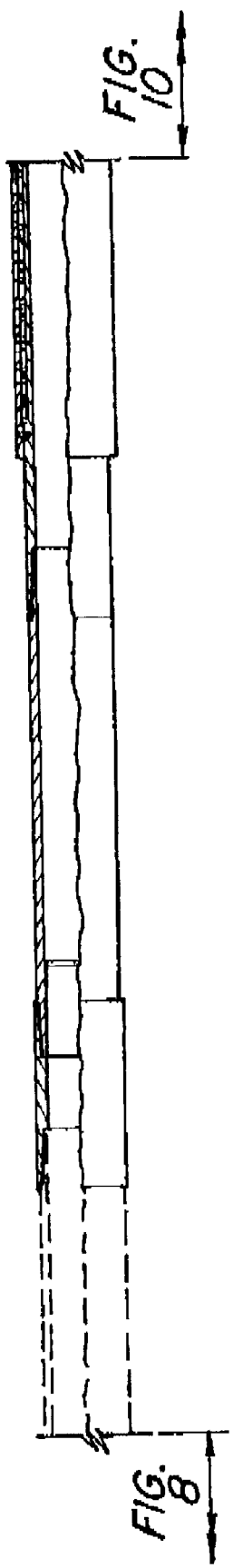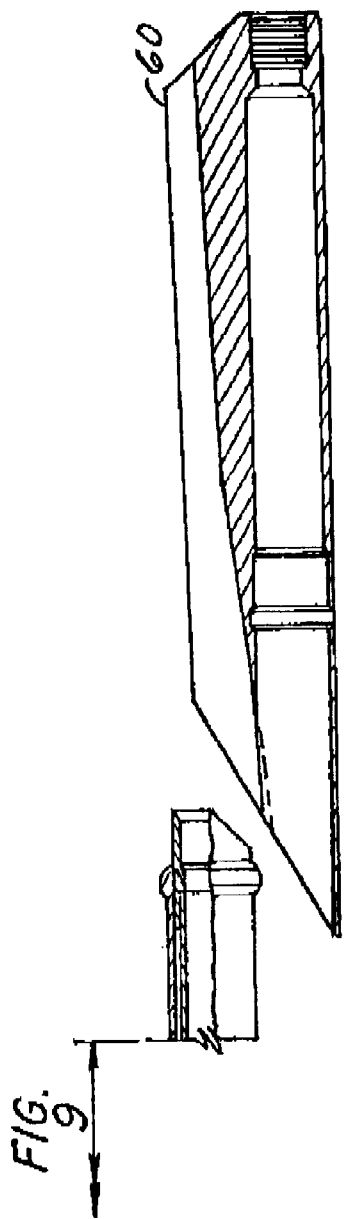

FLOW MONITORING AND CONTROL IN MULTI-LATERAL WELLBORES

CROSS-REFERENCE TO RELATED APPLICATIONS

This application claims the benefit of U.S. Provisional Application Serial No. 60/133,904 filed May 13, 1999, which is incorporated herein by reference.

BACKGROUND OF THE INVENTION

1. Field of the Invention

This invention relates to multilateral oil wells. More particularly, this invention relates to an apparatus for monitoring and controlling fluid flow within a multilateral well.

2. Prior Art

It has been known to split the flow in a multilateral well for reasons including the flow of fluids from or to the secondary bore while independently managing the primary bore. Conventional tools that split fluid flow in a single bore to a pair of parallel bores include a selective reentry tool (SRT) such as Baker Oil Tools Part No.783-55, available commercially from Baker Oil Tools, Houston, Tex. The SRT splits flow from a primary bore to two parallel bores using a Y-section. Commonly the parallel tubing string section below the set tool contains two 3½" diameter bores and the string section fits well within a 9⅝" standard casing. Although the device functions well for its intended purpose, the interest in controlling and monitoring flow characteristics within the multilateral wellbore is not fully satisfied by tools of the prior art such as the SRT. This is because it is difficult to determine flow rates in each of the bores independently. Prior art devices such as venturi flow meters have not been successfully used in the parallel bore section since conventionally sized 3½" venturi flow meters have an outside diameter of 5.937". Thus if a meter is placed next to a 3½" tube, the two will not fit in the 8.5" I.D. of a 9⅝" casing. Because of this it has been exceedingly difficult to determine what the flow is in the individual parallel bores. Yet the desire to measure the parallel bores independently, rather than merely sensing in the single bore persists. It would be advantageous to the art to be able to monitor and control the flows in the individual parallel bores. A device which can accomplish such result is desired by the art.

SUMMARY OF THE INVENTION

The above-identified drawbacks of the prior art are overcome or alleviated by the apparatus for flow monitoring and control in multilateral wellbores.

The invention comprises a selective reentry tool of a longer length, the length being sufficient to accept a pair of venturis (or flow control devices) one in each bore of the parallel bore sub. Each flow venturi includes a port at its most restricted portion which port is accessible by an external pressure gauge (or other sensor). Moreover, preferably, a second port is provided upstream (uphole) of the venturis to measure upstream pressure ahead of each venturi. A corresponding second external gauge or sensor is also provided. The gauges or sensors are preferably mounted in recesses extending from the outer diameter surface of the sub radially inwardly. In a preferred embodiment of the invention there are two recesses 180° apart and each located 90° from a bore of the parallel bores. By combining the two bores and two sensor recesses this allows for the incorporation of the sensor(s) (preferably two on each side) without the penalty of the excessive outside diameter as would be the case if such a tool were constructed using prior art components. Moreover, the external sensors are protected within the recess in the sub and formerly dead space is used to house the sensors thus making better use of all resources available. It is important to note that while the foregoing statement and following discussion of an embodiment of the invention is directed to multilateral wellbore application, the device described herein is applicable to any plural tubing well. Additionally, the concept hereof provides monitoring and/or control and as such includes not only the specific example disclosed herein but also encompasses the substitution of the monitoring devices with flow control devices and the gauges/sensors with actuators. Moreover, other embodiments use combinations of flow monitoring devices/ sensors and flow control devices/actuators.

BRIEF DESCRIPTION OF THE DRAWINGS

Referring now to the drawings wherein like elements are numbered alike in the several FIGURES:

FIG. 2 is a schematic side view of the parallel bore section of the invention illustrating the external sensors and pressure taps;

FIG. 3 is a broken away view illustrating the internal cross section elevational view of the invention; and FIG. 4 is a cross sectional view of the invention taken along section line 4—4 in FIG. 3;

FIGS. 5–9 are an elongated quarter section view of an actual embodiment of the invention;

FIG. 10 is a sectional view of a prior art scoop head diverter which is illustrated separately to provide understanding of its interaction with the invention.

DETAILED DESCRIPTION OF A PREFERRED EMBODIMENT

Figure 1:
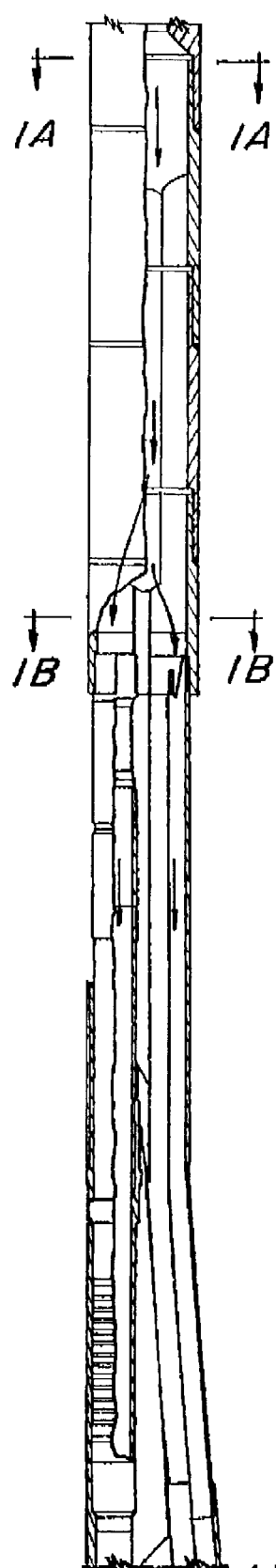
FIG. 1 is a side elevation quarter section view of a conventional selective reentry tool having a parallel bore sub.
Figure 1A:
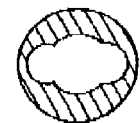
FIG. 1A is a cross section of the transitional area from a single bore to parallel bores within the mandrel of the prior art selective reentry tool taken along section line 1A—1A.
Figure 1B:
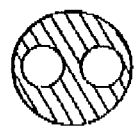
FIG. 1B is a cross section view of the parallel bore lower sub of the conventional selective reentry tool taken along section line 1B—1B.
Figure 5:
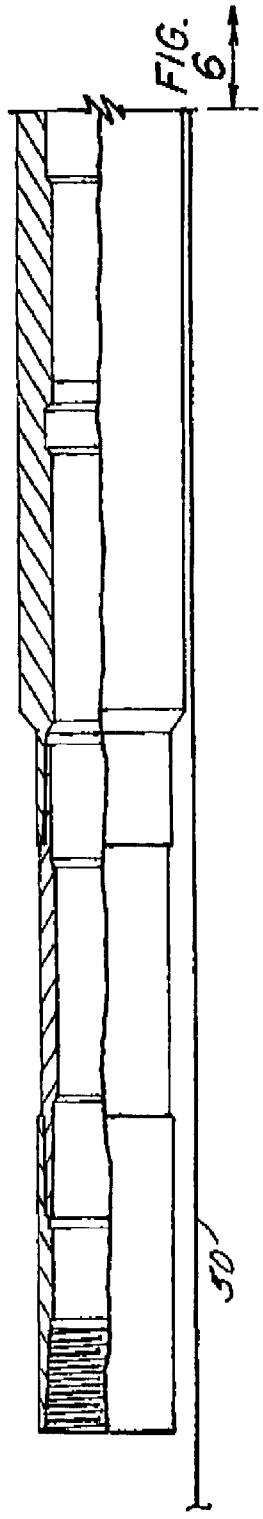

One of ordinary skill in the art will recognize the illustration of FIG. 1 as a standard selective reentry tool which is commercially available from Baker Oil Tools, Houston, Tex. Referring to FIGS. 1A and 1B, one will appreciate the cross section view of the transition area from a single bore to a parallel bore arrangement and a cross section of the parallel bore area, respectively. These cross section views will make clear the space constraints under which any monitoring device must function. The mandrel 10 in the area of the parallel bores/lower sub 12 contains bore 14 and bore 16 which are substantially identical to each other and are conventionally of a diameter of 3½". Because of the diameter of the bores versus the diameter of the flow device of the prior art, such devices cannot be used in such a bore as set forth hereinabove. Focusing on the areas between and adjacent bores 14 and 16 which are numeraled 18 and 20 one of ordinary skill in the art will appreciate that a substantial portion of the inside diameter of the mandrel is unused solid steel. The excess metallic material is not necessary for the mandrel to maintain pressure competency and therefore the inventor hereof has modified the lower sub 12 of the prior art selective reentry tool by elongating the same and to provide a recess area 22 which is visible in FIGS. 2 and 4 and a recess area 24 which is visible only in FIG. 4. Within each recess area, at least one and preferably two externally mounted sensors (pressure gauges in a preferred embodiment) 26 and 28 are mounted. Preferably, a control line 30 extends from the surface or an uphole controller within recess 22 or 24 or both to power and send signals to and from sensors 26 and 28. Sensors 26 and 28 access venturis 32 and 34 within sub 36 through pressure ports 38 which preferably enter the flow opening of each venturi 32 and 34 at the most restricted portion thereof. It is important to note that although venturis are specifically discussed and illustrated, they are but one embodiment and other flow monitoring or control devices may be substituted therefor. A generic term intended to cover both herein is "flow device". The second set of pressure ports enter each of the parallel bores upstream of the venturi sections. In order to maintain structural integrity of the lower sub 36 the recesses 22 and 24 are preferably spaced about 90° from parallel bores 40 and 42. With the sensors 26 and 28 on either side of the tool recessed within the outside diameter of the selective reentry tool of the invention, the sensors remain protected from damage during run-in and deployment. Moreover since each of the sensors are accessing bores 40 and 42 below the flow splitting point, true sensing of each individual bore 40 and 42 is accomplished. It should also be noted that other sensors may be added in order to sense pressure, flow rate, water cut, etc. as desired. With the information provided from the individual bores 40 and 42 decisions may be made regarding where adjustments are necessary i.e., whether in the primary bore or the lateral bore.

Figure 6:
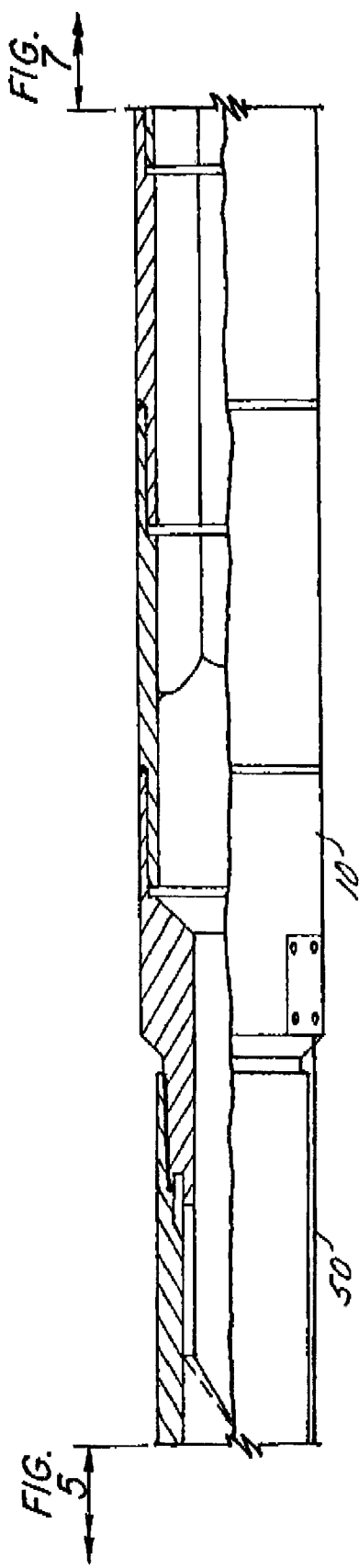
Figure 7A:
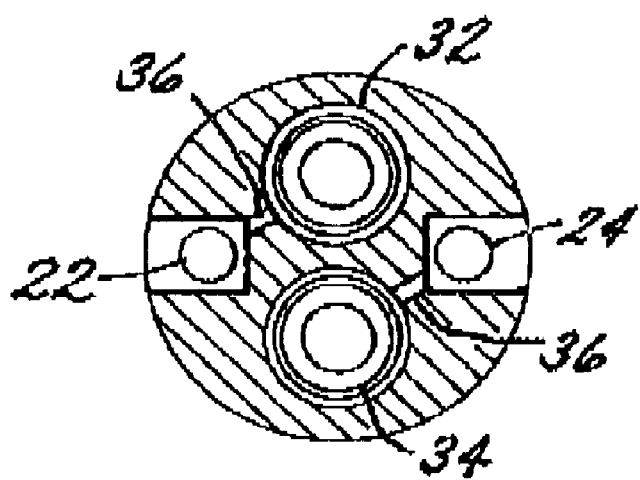
FIG. 7A is a cross section view of the tool illustrated in FIGS. 5–9, the cross section being taken from line 7A—7A on FIG. 7.

Referring to FIGS. 5–10, an illustration of an actual embodiment of the invention in elongated form is provided. One of skill in the art will note that much of the drawing is identical to a prior art selective reentry tool discussed above but that the section of the tool bridging FIGS. 6 and 7 is altered. In FIG. 6 the only difference is the TEC line 50 to an uphole location for monitoring and signal generation is milled into the mandrel 10 of the tool. The section of FIG. 7 identified by numeral 52 is longer than a prior art SRT by about 10 feet. As discussed previously, venturis 32 and 34 are in bores 40 and 42 respectively and the additional length of the invention is for this purpose. Recess area 22 is visible in broken lines in the background of FIG. 7 and a sensor (or actuator) would be mounted therein as described. Downhole of threaded connection 54, the device is conventional. In FIG. 10 one will recognize a scoophead diverter 60 which is commercially available from Baker Oil Tools and is known to the art. The illustration is provided to orient the reader and it will be appreciated that the diverter 60 will cause the lateral branch of the parallel tubes to kick off into the lateral branch bore of the multilateral well.

It will be understood that although the specific example of the invention is a monitoring device, actuators may be substituted for the venturi sensors and could operate devices to control flow which would be substituted for the venturis in the foregoing discussion. Any type of flow control device can be used, safety valves being an example. Additionally, since provisions made in the invention for two recesses in which sensors are placeable, it is possible to use sensors in both recesses. Sensor(s) in one recess and actuator(s) in the other recess or actuators in both recesses. Actuators may be used for many different purposes such as flow control.

While preferred embodiments have been shown and described, various modifications and substitutions may be made thereto without departing from the spirit and scope of the invention. Accordingly, it is to be understood that the present invention has been described by way of illustration and not limitation.

What is claimed:

1. A downhole plural bore flow system comprising:
   a mandrel providing a primary flow conducting bore, a transition area and a plural flow conducting bore construction in seriatim, said transition area defining a flow conducting area configured to join said primary bore to said plural bore construction;
   a flow device located within at least one bore of said plural bore construction; and
   a tap port providing access to each flow device, said port extending to at least one recess in an outside diameter of said mandrel wherein at least one of at least one sensor and at least one actuator is mounted and connected to said port.

2. A downhole plural bore flow system as claimed in claim 1 wherein said at least one recess is two recesses 180° apart and milled from the outer diameter of said mandrel.

3. A downhole plural bore flow system as claimed in claim 2 wherein each recess includes said at least one sensor or said at least one actuator.

4. A downhole plural bore flow system as claimed in claim 1 wherein said flow device is a flow monitoring device.

5. A downhole plural bore flow system as claimed in claim 4 wherein said flow monitoring device is a venturi.

6. A downhole plural bore flow system as claimed in claim 1 wherein said flow device is a flow control device.

7. A downhole plural bore flow system as claimed in claim 6 wherein said flow control device is a safety device.

8. A downhole plural bore flow system as claimed in claim 1 wherein said system includes a plurality of flow devices and a plurality of sensors.

9. A downhole plural bore flow system as claimed in claim 1 wherein said system includes a plurality of flow devices and a plurality of actuators.

10. A downhole plural bore flow system as claimed in claim 1 wherein said system includes at least one sensor and at least one actuator.

11. A downhole plural bore flow system as claimed in claim 1 wherein said system includes a plurality of sensors and a plurality of actuators.

* * * * *